United States Patent
Miller (10) Patent No.: US 10,320,288 B2
(45) Date of Patent: Jun. 11, 2019

(54) VOLTAGE CHARGE PUMP WITH SEGMENTED BOOST CAPACITORS

(71) Applicant: INTERNATIONAL BUSINESS MACHINES CORPORATION, Armonk, NY (US)

(72) Inventor: Christopher P Miller, Underhill, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/810,923

(22) Filed: Nov. 13, 2017

(65) Prior Publication Data

US 2018/0069473 A1    Mar. 8, 2018

Related U.S. Application Data

(63) Continuation of application No. 15/236,817, filed on Aug. 15, 2016, now Pat. No. 9,935,540, which is a continuation of application No. 14/658,809, filed on Mar. 16, 2015, now Pat. No. 9,525,338.

(51) Int. Cl.
*H02M 3/07* (2006.01)
*G05F 5/00* (2006.01)

(52) U.S. Cl.
CPC ............... *H02M 3/07* (2013.01); *G05F 5/00* (2013.01)

(58) Field of Classification Search
None
See application file for complete search history.

(56) References Cited

U.S. PATENT DOCUMENTS

| | | | |
|---|---|---|---|
| 5,469,110 A | 11/1995 | Liao | |
| 5,602,784 A * | 2/1997 | Kojima | G11C 8/08 365/189.09 |
| 6,097,161 A | 8/2000 | Takano et al. | |
| 6,198,645 B1 | 3/2001 | Kotowski et al. | |
| 6,798,274 B2 | 9/2004 | Tanimoto | |
| 7,307,911 B1 * | 12/2007 | Anand | G11C 7/065 365/189.07 |
| 7,663,427 B2 | 2/2010 | Fujiwara | |
| 7,714,636 B2 | 5/2010 | Chang et al. | |
| 8,072,256 B2 | 12/2011 | Pyeon | |
| 8,300,489 B2 | 10/2012 | Fifield et al. | |
| 8,493,134 B2 | 7/2013 | Hao et al. | |

(Continued)

FOREIGN PATENT DOCUMENTS

KR    100721899    5/2007

OTHER PUBLICATIONS

Notice of Allowance in related U.S. Appl. No. 15/236,944 dated Nov. 14, 2017, 17 pages.

(Continued)

*Primary Examiner* — Jeffery S Zweizig
(74) *Attorney, Agent, or Firm* — Steven Meyers; Andrew M. Calderon; Roberts Mlotkowski Safran Cole & Calderon, P.C.

(57) ABSTRACT

A voltage charge pump circuit with boost capacitor segments and boost delay chain structures are provided. The voltage charge pump circuit comprising a plurality of boost capacitor segments each of which is individually controlled by a respective signal line of a boost delay chain structure.

13 Claims, 5 Drawing Sheets

(56) References Cited

U.S. PATENT DOCUMENTS

| | | | |
|---|---|---|---|
| 8,625,382 B2* | 1/2014 | Hendrickson | G11C 8/08 |
| | | | 365/226 |
| 8,669,805 B2 | 3/2014 | Serventi et al. | |
| 8,755,242 B2 | 6/2014 | Lee et al. | |
| 9,525,338 B2 | 12/2016 | Miller | |
| 2010/0156512 A1 | 6/2010 | Chaoui | |
| 2011/0170368 A1 | 7/2011 | Fifield et al. | |
| 2013/0127522 A1 | 5/2013 | Mohan et al. | |
| 2016/0352221 A1 | 12/2016 | Miller | |
| 2017/0040888 A1 | 2/2017 | Miller | |

OTHER PUBLICATIONS

Notice of Allowance in related U.S. Appl. No. 15/236,817 dated Nov. 22, 2017, 16 pages.
"List of IBM Patents or Patent Applications Treated as Related" 1 page.
Office Action dated Jul. 20, 2018 in related U.S. Appl. No. 15/812,220, 11 pages.
Final Office Action dated Nov. 20, 2018 in related U.S. Appl. No. 15/812,220, 6 pages.
Notice of Allowance dated Jan. 25, 2019 in related U.S. Appl. No. 15/812,220, 15 pages.

\* cited by examiner

VOLTAGE CHARGE PUMP WITH SEGMENTED BOOST CAPACITORS

FIELD OF THE INVENTION

The invention relates to a voltage charge pump circuit and, more particularly, to a voltage charge pump circuit with boost capacitor segments and boost delay chain structures.

BACKGROUND

Phase change memory (PCM) is an emerging segment of semiconductor memory technology. Phase change memory operation requires a variety of DC power supply voltages to support read and write operations, with some voltages being higher than the external power supply. For example, phase change memory operation requires a variety of voltages to be generated on die to support operation with good DC characteristics of up to µS duration, e.g., ~0.4 V for bitline precharge, ~1 V for standard logic and ~2.5 V for wordline, read sense, and write supply. Tight power supply tolerances are required for resistance sensing and writing PCM arrays with differing load currents and duration.

Voltage charge pump circuits are required to raise the voltages higher than the external power supply. The requirements/demands on the high voltage supply are challenging and include the requirement of low ripple while being able to supply current over a wide range, high current supply capability, and good tolerance. However, voltage charge pump systems developed from other types of memory devices do not serve the unique requirements of phase change memory sufficiently. In other words, they do not supply high voltage over a wide range, with high current capability while also having low ripple.

Charge pumps are used in integrated circuits to provide a boosted supply voltage in applications such as eDRAM memory, FLASH memory, bandgap voltage references, etc. Typical boost circuits first charge a capacitor from an external supply and then transfer the stored charge into a capacitor on a boosted supply net. A ripple voltage, though, develops on the boosted supply net that needs to be minimized. Currently, these ripples are minimized by placing large filter capacitors (also called decoupling capacitance) on the boosted supply net and by the use of multiphase pumps.

For a given design, a charge pump supplies current to drive an intended load. The output load current can vary greatly depending upon the different operating modes or other conditions. Further, the pump output current will increase with higher pump frequency and supply voltage. To regulate the output voltage of a charge pump with good precision and a tight voltage tolerance it is necessary to use a regulator circuit to control a charge pump, typically turning it on and off so at to keep the output voltage within a desired range. Typically, a charge pump provides some excess charge before it can be turned off. In addition, the boosted voltage must fall to a lower potential before a regulator will turn the pump back on. The excess charge and fall in potential is a characteristic of regulation and adds to voltage ripple on the boosted supply net.

More specifically, a charge pump system can be sized to provide adequate current at low supply voltage. However, it will also typically have excessive ripple voltage unless the dcap is sized for the higher charge transfer at the maximum supply voltage. But, decoupling capacitance typically consumes close to 50% of the total pump area in the design and has a significant impact on chip size.

SUMMARY

In an aspect of the invention, a voltage charge pump circuit comprises a plurality of boost capacitor segments each of which is individually controlled by a respective signal line of a boost delay structure In an aspect of the invention, a charge pump architecture comprises a plurality of pump boost capacitor segments enabled as a function of response of power to current load.

In an aspect of the invention, a method comprises enabling of individual boost capacitor segments coordinated with delays to reduce forward bias and ripple.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to a voltage charge pump circuit and, more particularly, to a voltage charge pump circuit with boost capacitor segments and boost delay chain structures. More specifically, the present invention comprises a PFET voltage charge pump circuit with boost capacitor segments with individual boost timing control of capacitor segments during a boost phase. Advantageously, the voltage charge pump circuit can reduce parasitic pump currents and improve pump efficiency, while providing an efficient way to manage boost node forward bias for faster pump cycle times without forward bias charge injection. In addition, the voltage charge pump circuit can be mapped easily into different technologies.

In embodiments, the voltage charge pump circuit partitions the boost capacitor portion of a voltage pump circuit into boost capacitor segments. The activation of the boost capacitor segments can be staggered in time to manage forward bias of source and drain junction of the PFET based voltage charge pump circuit and can also be individually enabled to allow system level adjustability of pump output current. The adjustability of output current permits the pump output to be regulated for current demand to reduce ripple on the supply.

In more specific embodiments, the voltage charge pump circuit comprises a voltage pump which is divided into multiple smaller capacitances with each of the smaller capacitances (boost capacitors) having a separate control timing so each of the multiple smaller capacitances can fire at a different time. The timing of each smaller capacitance can be separately controlled to limit the over voltage of the boosted node. For example, the delay of timing can be controlled, individually, making it possible to adjust the delay of the overvoltage produced on the boosted node. In further embodiments, the individual boost capacitor segments can be coordinated with delays, e.g., controlled by digital enable signals, to control whether the boost capacitor segment fires at all. In embodiments, it is also possible to control the enable to control output current of the charge pump and to control the ripple of the charge pump. In embodiments, the signal delays can be created with analog circuit types and using analog circuit methods.

The voltage charge pump circuit described herein can be manufactured in a number of ways using a number of different tools. In general, though, the methodologies and tools are used to form structures with dimensions in the micrometer and nanometer scale. The methodologies, i.e., technologies, employed to manufacture the voltage charge pump circuit have been adopted from integrated circuit (IC) technology. For example, the voltage charge pump circuits are built on wafers and are realized in films of material patterned by photolithographic processes on the top of a wafer. In particular, the fabrication of the voltage charge pump circuit uses three basic building blocks: (i) deposition of thin films of material on a substrate, (ii) applying a patterned mask on top of the films by photolithographic imaging, and (iii) etching the films selectively to the mask.

In further aspects of the invention, the method comprises enabling of individual boost capacitor segments coordinated with digital delays to compensate for a higher pump frequency and/or supply voltage. Moreover, the method comprises enabling of individual boost capacitor segments coordinated with digital delays to compensate for current loads that vary due to different modes or other conditions.

Figure 1:
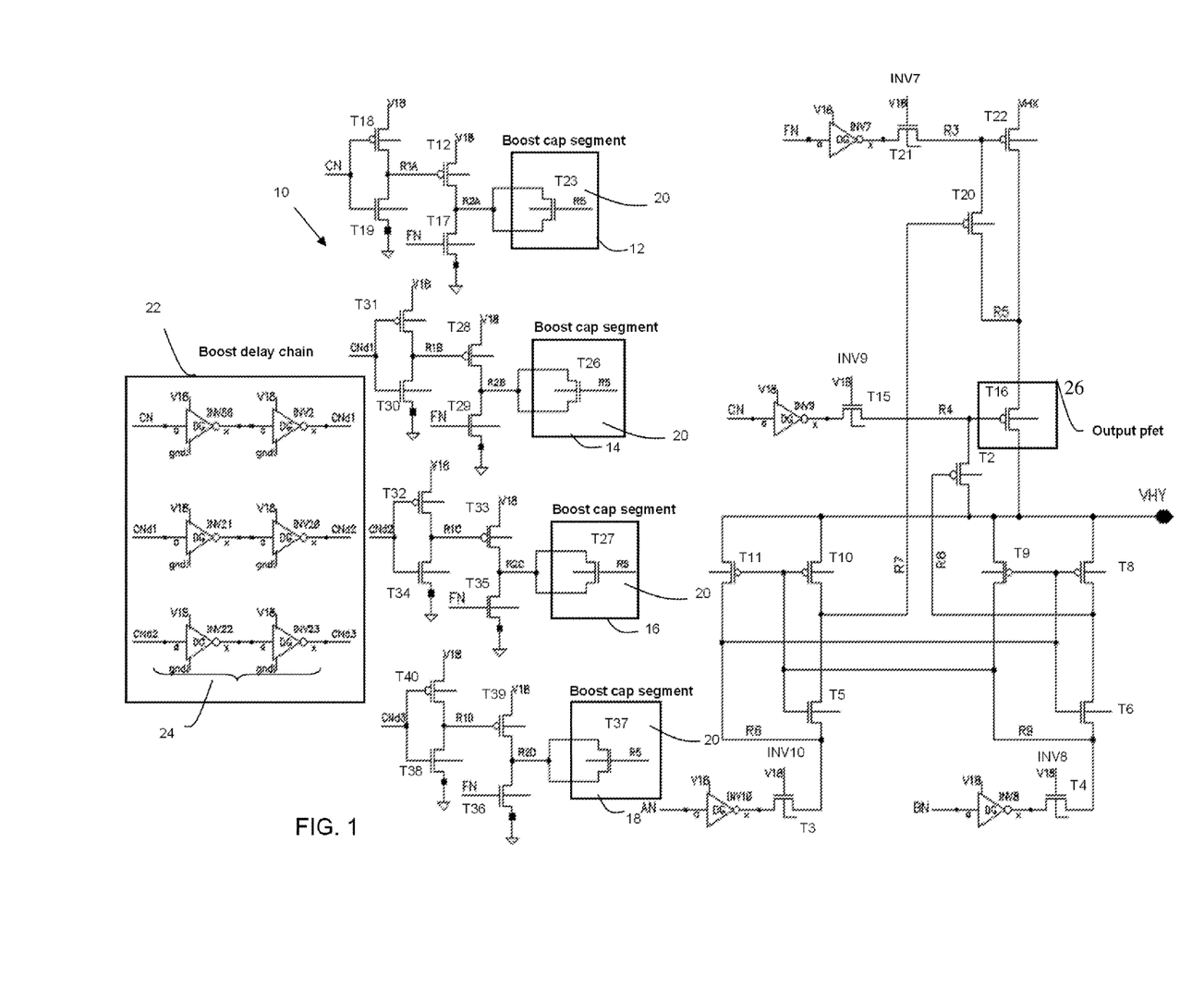
FIG. 1 shows a voltage charge pump circuit with boost capacitor segments and a boost delay chain structure in accordance with aspects of the present invention.

FIG. 1 shows a voltage charge pump circuit with boost capacitor segments and a boost delay chain structure in accordance with aspects of the present invention. In embodiments, the circuit pump system 10 includes a plurality of boost capacitor segments 12, 14, 16 and 18 with associated drive circuitry as described further herein. Although four boost capacitor segments are shown in the circuit pump system 10, one of skill in the art would appreciate that any number of boost capacitor segments and associated drive circuitry can be implemented within the scope of the present invention.

In embodiments, the boost capacitor segments 12, 14, 16 and 18 each include, for example, an NFET 20 configured to be used as the capacitor of the segmented boost capacitor. The boost capacitor segments 12, 14, 16 and 18 are driven by boost devices, e.g., boost transistors. In more specific embodiments, (i) boost capacitor segment 12 includes boost transistor T23 (T23 is a NFET transistor configured to be used as the capacitor of the boost capacitor segment 12) with associated boost drive devices (transistors T12, T17-T19);

(ii) boost capacitor segment 14 includes boost transistor T26 (T26 is a NFET transistor configured to be used as the capacitor of the boost capacitor segment 14) with associated boost drive devices (transistors T28, T29-T31);

(iii) boost capacitor segment 16 includes boost transistor T27 (T27 is a NFET transistor configured to be used as the capacitor of the boost capacitor segment 16) with associated boost drive devices (transistors T33, T32, 34 and 35); and (iv) boost capacitor segment 18 includes boost transistor T37 (T37 is a NFET transistor configured to be used as the capacitor of the boost capacitor segment 18) with boost drive devices (transistors T39, T36, 38 and 40).

In embodiments, the boost capacitor segments 12, 14, 16 and 18 are chained together by a boost delay chain 22, comprising a pair of inverters 24 (in series) on each signal line designated by its input boost signals, CN, CNd1, CNd2, CNd3. As should be understood by those of ordinary skill in the art, the pair of inverters 24 (in series) will preserve the polarity of the signal. The output of each of the boost capacitor segments 12, 14, 16 and 18 are connected to node R5, which feeds to an output PFET 16.

By using the delayed signals generated by the boost delay chain 22, each boost capacitor segment 12, 14, 16, 18 can fire at a different time, sequentially, thus feeding a separate boost signal to output PFET 16. Thus, the timing of each smaller capacitance 12, 14, 16 and 18 can be separately controlled to limit the over voltage of the boosted node. By way of example, the pair of inverters 24 of the boost delay chain 22 will provide a delayed boost signal, e.g., CNd1, CNd2, CNd3, to each subsequent segmented boost capacitor 14, 16 and 18 as follows:

(i) initial input boost signal CN for controlling boost capacitor segment 12 is input to the pair of inverters, which results in a delayed output signal CNd1;

(ii) delayed boost signal CNd1 then controls boost capacitor segment 14, which is also input to the pair of inverters resulting in a delayed output signal CNd2;

(iii) delayed boost signal CNd2 then controls boost capacitor segment 16, which is also input to the pair of inverters resulting in a delayed output signal CNd3; and (iii) delayed boost signal CNd3 then controls boost capacitor segment 18.

Figure 2A:
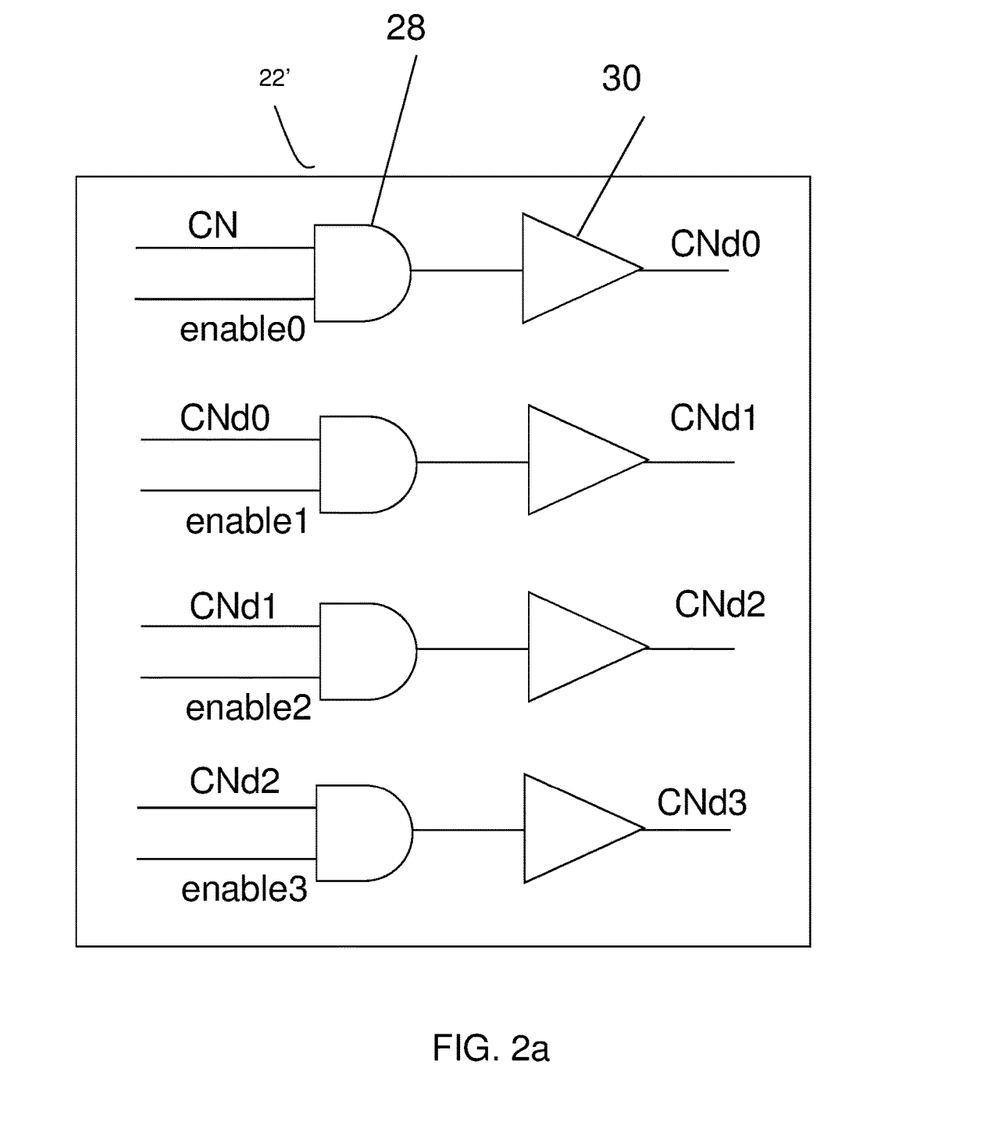
FIGS. 2a and 2b show boost delay chain structures used with a voltage charge pump circuit of FIG. 1, in accordance with aspects of the present invention.

FIG. 2a shows an alternate boost delay chain structure with individual segment enables, in accordance with aspects of the present invention. More specifically, the boost delay chain structure 22' of FIG. 2a includes individual enable signals for controlling each boost capacitor segment 12, 14, 16, 18 (e.g., boost transistor and boost drive devices). In embodiments, individual signal lines for each of the boost capacitor segments includes an AND 28 gate in series with a non-inverting buffer 30, which maintains the polarity of the input signals.

In operation, the individual boost capacitor segments 12, 14, 16, 18 of FIG. 1, for example, can be coordinated with digital delays (enable signal), e.g., enable0, enable1, enable2, enable3. By using the enable signals as inputs to each NAND gate 28, it is now possible to control how many of the boost capacitor segments will fire. For example, any of the enable signals not activated for a signal line in the boost delay chain 22', the associated boost signal, e.g., CNd0, CNd1, CNd2, CNd3, and all subsequent boost signals in the chain will not fire for the associated boost capacitor segment 12, 14, 16 or 18.

Figure 2B:
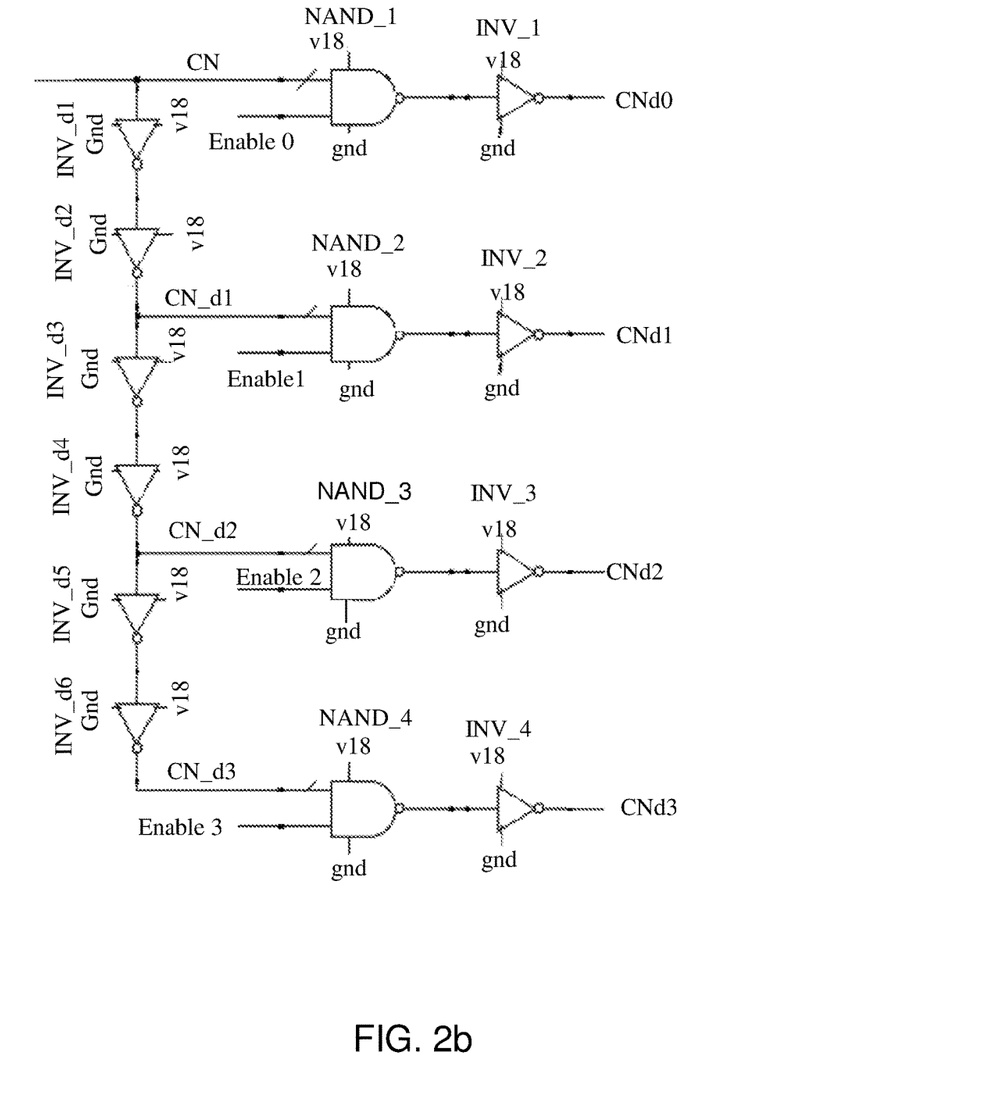

FIG. 2b shows another embodiment of boost delay chain with individual segment enables such that disabling any segment does not break the delay chain. Subsequent boost segments beyond a disabled segment still fire if enabled.

In embodiments, the enable signal can be activated using load sensing (e.g., comparator) to allow better regulation of boost voltage vs. load current. That is, the charge pump architecture can control a number of pump boost capacitor segments to be enabled as a function of the response of power system to current load.

More specifically, upon activation of each enable signal, in sequence, (i) input signal CN will control boost capacitor segment 12, which is also input to the NAND gate and inverter, resulting in a delayed output signal CNd0;

(ii) delayed signal CN_d1 then controls boost capacitor segment 14, which is input to the NAND gate and inverter resulting in a delayed output signal CNd1;

(iii) delayed signal CN_d2 then controls boost capacitor segment 16, which is also input to the NAND gate and inverter resulting in a delayed output signal CNd2; and (iii) delayed signal CN_d3 then controls boost capacitor segment 18.

In this way, it is possible to sequentially activate and control each of the boost capacitor segments, individually, by activating the enable signal. This provides the ability to control individual segments, in sequence, in order to proportion the output current, e.g., adjust or fine tune the output current during different modes, e.g., standby mode. This, in turn, allows the output current to be fine tuned, incrementally, and reduce any excessive ripple in proportion to the load current output from the voltage pump.

By way of an example illustration, Table 1 shows a comparison of ripple at different load currents for a conventional charge pump system and that which is described with respect to FIG. 1. Table 1 shows improvement of ripple using the voltage charge pump circuit of the invention.

TABLE 1

| Design (mA) | 3.2 | 4 | 4.8 | 5.6 | 6.4 | 7.2 | 8 | 8.8 | Idle (100 μA) | Stby (100 μA) |
|---|---|---|---|---|---|---|---|---|---|---|
| Conventional Pump | 26.6 | 21.8 | 24.4 | 24.1 | 24.1 | 22.5 | 21.2 | 19.6 | 22.3 | 15.1 |
| Segmented charge pump | 9.6 | 9.6 | 9.3 | 8.7 | 9.7 | 10 | 10.1 | 8.8 | 11.7 | 10.6 |

Figure 3:
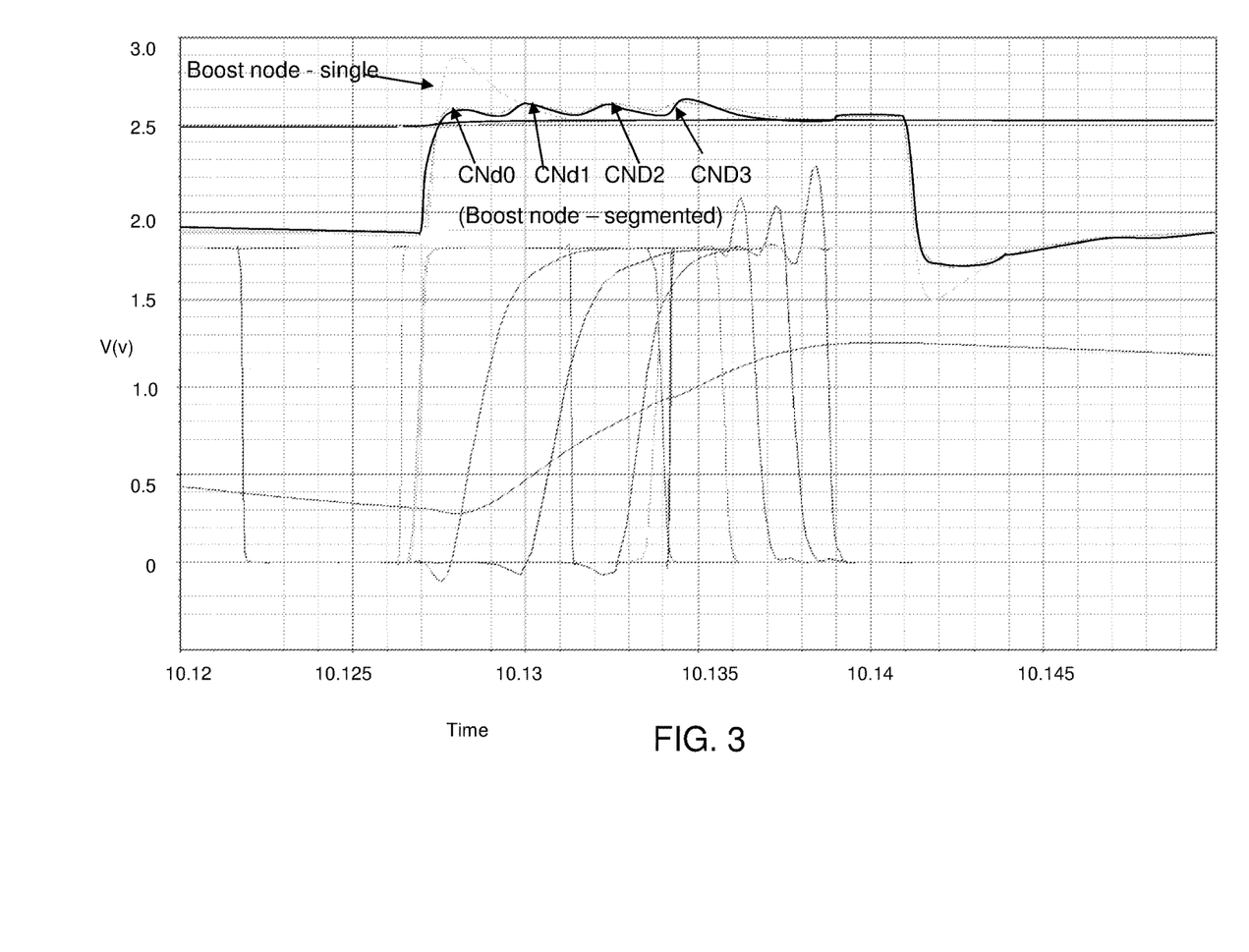
FIG. 3 shows a boost capacitor waveform comparing a voltage charge pump circuit with a single boost capacitor vs. boost capacitor segments with a long delay.

FIG. 3 shows a boost capacitor waveform comparing a voltage charge pump circuit with a single boost capacitor vs. boost capacitor segments with a long delay in accordance with aspects of the invention. As shown in FIG. 3, the single boost capacitor has a peak charge of about 2.9 V, compared to the voltage charge pump circuit with the segmented boost capacitors which have a peak voltage of about 2.6 V for each of the input signals, CNd0, CNd1, CNd2, CNd3.

The voltage spike of the single boost capacitor results in a large forward bias at node R5, which is not well tolerated. For example, with increasing forward-bias voltage, the depletion zone of the output PFET 16 at node R5 eventually becomes thin enough that the zone's electric field cannot counteract charge carrier motion across the p-n junction, as a consequence reducing electrical resistance. The electrons that cross the p-n junction into the P-type material (or holes that cross into the N-type material) will thus diffuse in the near-neutral region. Therefore, the amount of minority diffusion in the near-neutral zones determines the amount of current that may flow through the diode. Also, this voltage spike will result in transistor latch-up. In comparison, the forward bias resulting from the peak voltage of about 2.6 V using the segmented boost capacitors is well tolerated, thus avoiding latch-up issues and providing a smoother output on node R5.

Figure 4:
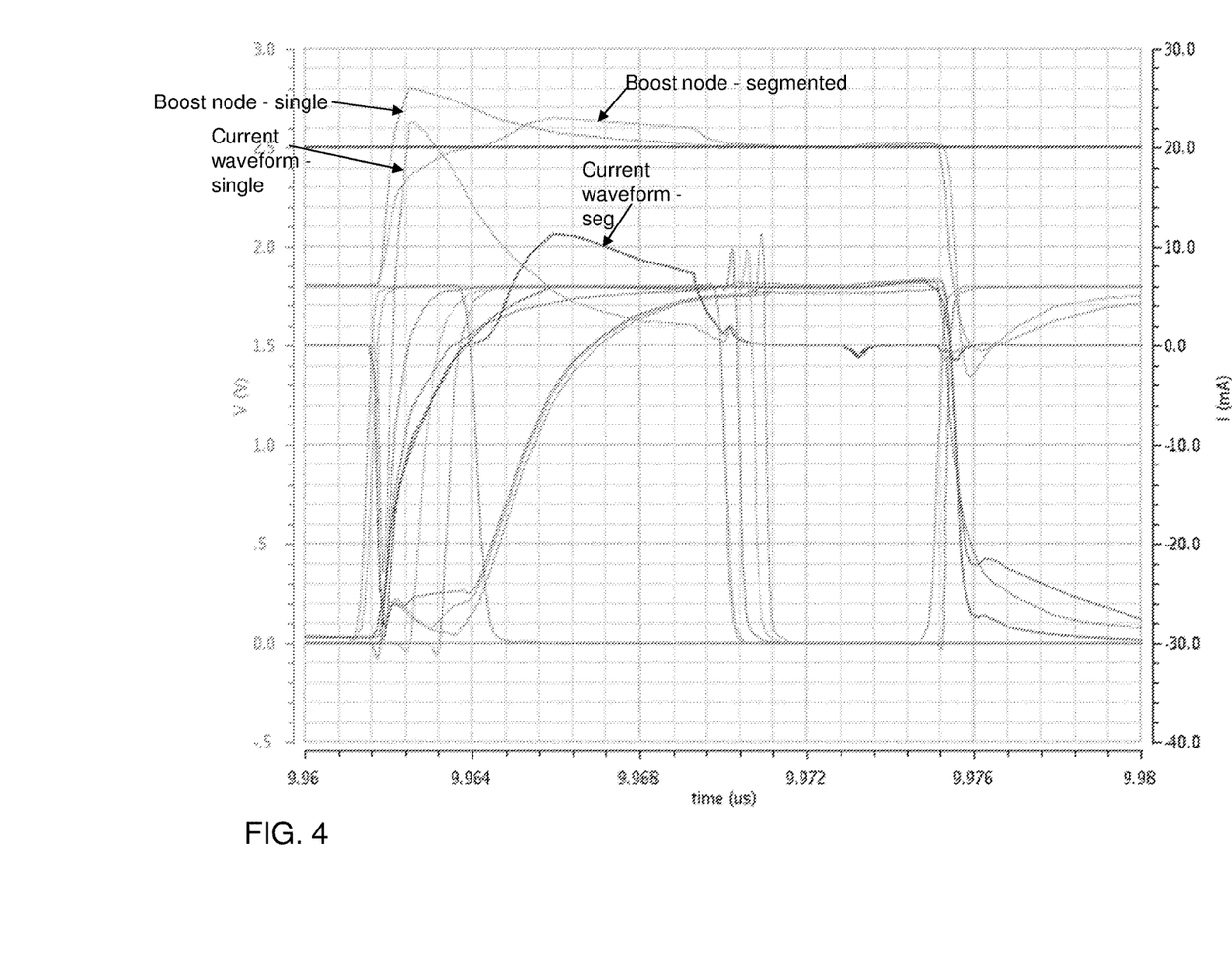
FIG. 4 shows a boost capacitor waveform comparing a voltage charge pump circuit with a single boost capacitor vs. boost capacitor segments with a short delay.

FIG. 4 shows a boost capacitor waveform comparing a voltage charge pump circuit with a single boost capacitor vs. boost capacitor segments with a short delay. As shown in this representation, at about 9.962 milliseconds, the ripple will begin to blend together using the voltage charge pump circuit with the segmented boost capacitors. This is in comparison to the single boost capacitor.

Operation of Voltage Charge Pump Circuit With Boost Capacitor Segments

As each of the boost capacitor segment and related circuitry comprise similar structures, only an explanation of operation of the segmented boost capacitor 12 is required for an understanding of the present invention. By way of explanation of the operation of the circuit pump system 10, several power supply connections are provided, including a ground potential connection which is typically 0 Volts, a high potential supply which in this example is 1.8 Volts and a VHX which is a precharge voltage supply equal to the high potential or it may be at a different potential. VHY is the output of the pump, which has a voltage level that is boosted higher than the VHX supply potential by operation of the circuit pump system 10.

For segmented boost capacitor 12, inverter INV7 and transistors T20-T22, as well as inverter INV10 and transistors T3, T5, T10 and T11 comprise a precharge circuit which is used to charge the boost transistor T23 gate node to a VHX potential during the precharge phase. The inverter INV9 and transistors T2, T15 and T16, and inverter INV8 and transistors T4, T6, T8 and T9 comprise the output circuit which allows the boost charge to flow from circuit node R5 to the output of the charge pump VHY during the boost phase.

As should be understood, each segment will have two phases in operation. A first phase of operation is the precharge phase. During this phase, for example, the circuit node R2A (for boost capacitor segment 12) is held to ground potential by transistor T17 and signal FN is at a high potential. Circuit node R1A is held at a high potential via PFET transistor T18 with NFET transistor T19 turned off. At the same time circuit output node R5 is being precharged to the VHX potential by PFET transistor T21, whose gate, circuit node R3, is held at a ground potential by the output of inverter INV7 through transistor T22. The duration of the precharge phase is such that node R5 and the gate of the boost transistor T23 will substantially reach a full VHX potential before the end of the precharge phase.

At the end of the precharge phase signals BN and FN are at a high potential holding circuit nodes R3 and R9 to a ground potential at the outputs of inverters INV7 and INV8. Also at the end of the precharge phase signals AN and CN are at a ground potential, circuit nodes R4 and R6 at the boosted supply potential, VHY, transistors T3 and T15 are substantially cut-off and not conducting current. Because node R6 is at a boosted high potential, circuit node R8 is held at ground potential through NFET transistors T6 and T4. Because circuit node R8 is at ground potential, PFET transistor T2 is on and holds circuit node R4 to the boosted output potential of VHY and output transistor T16 is cut-off and not conducting current.

The second phase of operation is the boost phase of each segmented boost capacitor. This phase directly follows the precharge phase. At the start of the boost phase, signal BN transitions to a ground potential causing the output of inverter INV8 to transition to a high potential and raising the potential of the node R9 to a NFET threshold below the high potential through NFET transistor T4. Also FN transitions to a ground potential turning off NFET transistor T17 and causing output of inverter INV7 to transition to high potential bringing circuit node R3 and the gate of PFET transistor T21 to a NFET threshold below the high potential through NFET transistor T22.

At the next step of the boost phase signal AN transitions to a high potential causing the output of inverter INV10 to transition to a ground potential and pulling circuit nodes R6 through transistor T3 and node R7 to ground potential through NFET transistor T5. With node R6 at a ground potential, circuit node R8 is pulled up to the boost potential VHY via PFET transistor T8 turning off PFET transistor T2. Also with R6 at ground potential R9 is pulled up to the boosted potential VHY via PFET T9. Further with node R7 at a ground potential PFET transistor T20 is turned on strongly connecting circuit node R3 to circuit node R5. The capacitance of circuit node R5 is much greater than circuit node R3 causing R3 to substantially charge up to and become equal to the R5 high potential.

The last step of the boost phase, signal CN transitions to a high potential causing circuit node R1A to discharge to a ground potential through NFET transistor T19 which in turn causes PFET transistor T12 to turn on and raise circuit node R2 and the source and drain nodes of net transistor T23, the boost transistor to a high potential and pumping charge onto circuit node R5. Signal CN rising also causes the output of inverter INV 9 to transition to ground potential turning on PFET output transistor T16. With output transistor T16 turned on the charge pumped onto boost node R5 flows onto the boosted output VHY.

The boost phase ends and the next precharge phase begins with signal AN transitioning back to a ground potential which will bring circuit nodes R6 and R7 to a threshold below the high potential followed by CN transitioning back to a ground potential which causes node R1A to transition to a high potential turning off PFET transistor T12 and raising node R4 to a threshold below the high potential. After the transition of CN, BN rises to a high potential and returns nodes R8 and R9 to ground potential. Node R8 at ground potential turns on transistor T2 and further raises node R4 to the boosted supply level fully turning off PFET output transistor T16. The signal FN can then rise to a high potential as the start of the next precharge phase. With FN at a high potential, circuit nodes R2A and R3 are returned to ground potential and the gate of NFET boost capacitor T23 begins precharging to the VHX potential again.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method comprising enabling of individual boost capacitor segments coordinated with delays to at least one of reduce forward bias and reduce ripple and control output current or voltage, and charging an output PFET device by a boost device in each of the individual boost capacitor segments,
   wherein a first line of signal lines of a boost delay structure comprises a NAND gate in series with a first inverter, and
   subsequent signal lines of the signal lines of the boost delay structure comprise a pair of inverters in series with a single input and a second NAND gate in series with a second inverter for corresponding boost capacitor segments of the boost delay structure.

2. The method of claim 1, wherein the individual boost capacitor segments are individually controlled by a respective signal line of the boost delay structure.

3. The method of claim 2, further comprising controlling individually boost timing of each of the individual boost capacitor segments during a boost phase.

4. The method of claim 3, further comprising delaying an input boost signal to a subsequent boost capacitor segment.

5. The method of claim 4, wherein the delayed input boost signal fires each boost capacitor segment at a different time.

6. The method of claim 2, further comprising providing enable signals for enabling each individual signal line such that, upon activation of an enable signal, a respective one of the individual boost capacitor segments are individually controlled.

7. The method of claim 1, wherein the individual boost capacitor segments are driven separately to limit over voltage of a boosted node.

8. The method of claim 1, further comprising coordinating timing control of the individual of boost capacitor segments with digital delays.

9. The method of claim 1, further comprising distributing boost charge of the individual of boost capacitor segments over time to control pump output current.

10. The method of claim 1, wherein the boost device in each of the individual boost capacitor segments comprises a boost drive transistor.

11. The method of claim 10, wherein the boost drive transistor is a NFET.

12. The method of claim 1, wherein the individual boost capacitor segments are chained together by a boost delay chain which includes the pair of inventors in series.

13. The method of claim 1, wherein the second NAND gate includes an input which is electrically connected to an enable signal.

* * * * *